Patented Oct. 6, 1936

2,056,441

UNITED STATES PATENT OFFICE 2,056,441

PROCESS FOR PREPARING OPTICALLY ACTIVE TRANS-PI-HYDROXYCAMPHOR FROM OPTICALLY ACTIVE ALPHA-PI-(TRANS)-DIHALOGEN-CAMPHOR

Yasuhiko Asahina and Morizo Ishidate, Tokyo, Japan

No Drawing. Application June 3, 1935, Serial No. 24,772. In Japan February 28, 1935

3 Claims. (Cl. 260—133)

This invention relates to improvements in a process for manufacturing optically active trans-π-hydroxycamphor from optically active α-π-(trans)-dihalogen-camphor. The process consists of a series of two steps; heating the raw material in an organic acid or in a previously made ester of an α-halogen-trans-π-hydroxy-camphor with a salt of the corresponding organic acid so that α-halogen-trans-π-acylhydroxycamphor is produced; and heating this produced material in an organic solvent with an alkali and zinc so as to reduce and saponify the material for producing trans-π-hydroxycamphor.

The object of this invention is to obtain a material at a good percentage of yield and in a pure condition, from which optically active isoketopinic acid or trans-π-oxocamphor having a cardiotonic action can be obtained.

The raw material, α-π-trans-dihalogen-camphor, has a chemical construction as shown later on by a reference number I, and can be obtained by a known process as disclosed by Kipping and Pope (see Journal of Chemical Society, vol. 67, P. 371, 1895 D. C.). The melting point and specific rotation of α-π-dibromo-camphor, α-π-dichloro-camphor and α-chloro-π-bromo-camphor are, 153° C. and about 100 degrees, 118° C. and about 85 degrees, and 138° C. and about 85 degrees, respectively, and the crystal of the first two materials is pyramidic and that of the last one is prismatic.

stance is poured in water, and this solution is neutralized with carbonate of alkali, and the produced α-bromo-π-acetyl-hydroxycamphor is extracted by ether. After this ether solution is evaporated α-bromo-π-acetyl-hydroxycamphor is distilled out, at 25 mm. of mercury column at a temperature of 176° to 178° C. in an oil-like condition. The quantity of product is about 400 grams, and its chemical construction is shown hereinafter by a reference number II.

Second step. Production of trans-π-hydroxy-camphor: 350 grams of α-bromo-π-acetyl-hydroxycamphor is dissolved in alcohol of the same quantity, to which is added 20% caustic alkali of 250 grams. Zinc powder of 120 grams is added to this solution little by little while the latter is being stirred under a hot state. When all the zinc powder has been added, the solution is heated on a water bath for a further duration of one hour. It is then cooled and filtered, and a larger part of alcohol is distilled off under a reduced pressure, and the product is extracted by ether. When the extracted product is recrystallized from petroleum-benzin, pure trans-π-hydroxycamphor is obtained. The melting point of this substance is 233° C. and its specific rotation is 63 degrees. Its chemical construction is shown by a reference number III, and its semi-calbazon has a melting point of 225° C.

The chemical reactions above mentioned can be shown by the following expression.

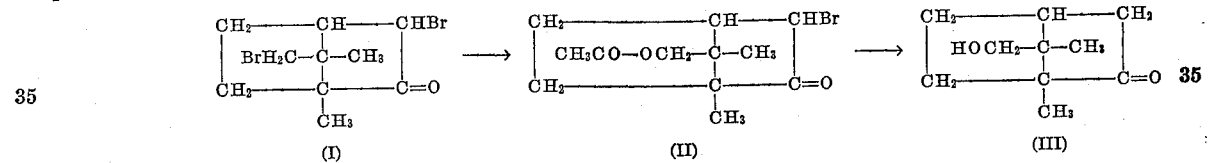

The process can be started from any of these raw materials, and the following is an example which explains this invention starting from α-π-dibromo-camphor.

First step. Production of α-bromo-trans-π-acylhydroxycamphor: To 400 grams of α-π-dibromo-camphor are added 800 grams of potassium acetate anhydride and 800 grams of glacial acetic acid, and this mixture is heated at a temperature of about 200° C. on an oil bath for a duration of 15 hours.

In this case, acetic acid and potassium acetate can be replaced by α-bromo-π-acetyl-hydroxycamphor previously made and potassium acetate, or by propionic acid or trichloro-acetic acid and their salts of potassium.

After the heating is ended, the reacted sub-

The process can be started with α-π-dichloro camphor or α-chloro-π-bromocamphor as a raw material as before mentioned, and the results are substantially equal. However, when α-π-dichlorocamphor is used as a raw material, the reaction of the first step requires 20 to 30 hours instead 15 hours as explained in the above example.

What we claim is:—

1. A process for preparing optically active trans-π-hydroxycamphor from α-π-(trans)-dihalogen-camphor, comprising heating the raw material in a lower aliphatic acid with an alkali metal salt of the corresponding acid so as to induce the material into α-halogen-π-acylhydroxycamphor, and heating the product with zinc powder in alcohol whereby the product is reduced and saponified.

2. A process for preparing optically active trans-π-hydroxycamphor from α-π-(trans)-dihalogencamphor, comprising heating the raw material in a lower aliphatic acid with its salt of potassium, and heating the product with zinc powder in alcohol containing a caustic alkali.

3. A process for preparing optically active trans-π-hydroxycamphor from α-π-(trans)-dihalogencamphor, comprising heating the raw material in a previously made lower aliphatic acid-ester of an α-halogen-trans-π-hydroxycamphor with an alkali metal salt of the corresponding acid, and heating the product with zinc powder in alcohol containing a caustic alkali.

YASUHIKO ASAHINA.
MORIZO ISHIDATE.